Patented Mar. 14, 1939

2,150,507

UNITED STATES PATENT OFFICE 2,150,507

ALKYL METHACRYLIC ESTERS AND PROCESS OF MAKING SAME

Edward L. Kropa, East Orange, N. J., assignor to Ellis-Foster Company, a corporation of New Jersey No Drawing. Application March 31, 1937, Serial No. 134,015

2 Claims. (Cl. 260—486)

This invention relates to the preparation of unsaturated esters and in particular to the dehydration of α-hydroxy isobutyric esters to methacrylic esters.

According to this invention, α-hydroxy isobutyric ester is treated with a reagent capable of forming a derivative of the type

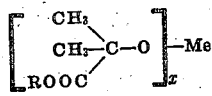

(where R stands for an alkyl grouping, Me a metallic or non-metallic grouping and the value "$x$" is the valance of Me) and subjecting the product to heat whereby decomposition occurs into a hydrated derivative of Me and the unsaturated ester.

As reagents capable of reacting with the oxyisobutyric ester may be mentioned silicon chloride, stannic chloride, phosphorus chloride and phosphorus oxychloride, sulphuryl chloride and thionyl chloride, yielding, respectively, silicic oxyisobutyric ester, stannic oxyisobutyric ester, phosphoric oxybutyric ester and phosphorus oxybutyric ester, sulphuric oxybutyric ester and sulphurous oxybutyric ester. The chlorides may be very effectively used inasmuch as they yield hydrogen chloride which escapes from the reaction mixture.

In carrying out the invention, the hydroxy isobutyric ester is added slowly to the active chloride with or without cooling but under conditions which preclude the presence of moisture inasmuch as the presence of water would destroy the active chloride and decompose the resulting metallic (or non-metallic) organic derivative. The reaction mixture is then warmed under conditions which allow the escape of hydrogen chloride.

The resulting mass is then subjected to heat treatment whereby decomposition occurs into the unsaturated ester. Inasmuch as the unsaturated ester is readily susceptible to polymerization, known polymerization inhibitors such as copper, sulphur, tannic acid and the like may be added at this point.

The amount of the active halides used may be varied in quantity but usually it is preferable to use the halide in such a ratio as to convert all of the halide into hydrogen halide, in other words, in stoichiometrical proportions. With phosphorus halides, one mole proportion is used to 3 mole proportions of the oxyisobutyric ester; with stannic and silicon halides, one mole proportion is used to 4 mole proportions of the oxybutyric ester.

*Example 1.*—Phosphorus oxychloride (16 parts) was slowly treated with 40 parts of ethyl oxybutyrate. Hydrogen chloride gas was given off. The reaction mixture was warmed on a water bath until hydrogen chloride gas evolution ceased. The reaction mixture was then distilled at atmospheric pressure and the distillate was washed with water saturated with sodium chloride, dried over anhydrous sodium sulphate and redistilled over tannic acid to yield ethyl methacrylate.

The residue remaining from the distillation was water-white, indicating that very little carbonization and polymerization had occurred. Phosphorus trichloride under similar conditions behaves in an analogous manner.

*Example 2.*—Silicon tetrachloride (17 parts) was slowly treated with 54 parts of ethyl oxybutyrate and the reaction mixture warmed until hydrogen chloride gas ceased to be evolved. Approximately 0.1 part of copper bronze powder was added and the mixture heated in an oil bath, the temperature of which was about 200° C. The distillate was washed with brine, dried over sodium sulphate and redistilled to yield ethyl methacrylate. Stannic chloride under similar conditions yields the unsaturated acrylic ester.

It is readily apparent from this invention that a large number of active chlorides will react with the oxyisobutyric esters resulting in the formation of a neutral organic-inorganic ester. The organic-inorganic ester on thermal decomposition decomposes into the methacrylic ester and the inorganic residue.

The methacrylic esters may be polymerized to high-molecular weight derivatives of a resinous nature by means of oxidizing agents and the like.

In the above examples the process is illustrated by the treatment of ethyl oxyisobutyrate to give ethyl methacrylate. Esters of other alcohols give a methacrylic ester corresponding to the alcohol. For example, methyl oxyisobutyrate yields methyl methacrylate. Mixtures of esters may also be treated.

The reaction of phosphorus chloride with oxyisobutyrates has been described in the literature. However, a large excess of phosphorus chloride was used and the product was polymerized to a great extent. In the present invention, substantially stoichiometrical proportions of reactants are used with the advantages not only on the score of economy but also from the standpoint of ease of manipulation and purity of the resulting product.

The ethyl methacrylate, which has been illustrated in the foregoing, has a somewhat higher boiling point than methyl methacrylate. When the monomeric esters are polymerized, however, the melting points of the polymeric derivatives are reversed, that is, the polymethyl methacrylate has a higher softening point than the polyethyl methacrylate. This is advantageous when injection molding is employed because the ethyl methacrylate permits a lower temperature in the injection molding apparatus.

However, by making mixtures of methyl and ethyl methacrylate the temperature used in injection molding can be suitably adjusted, and for this purpose I recommend a proportion ranging from 1 part of methyl methacrylate to 3 parts of ethyl methacrylate up to, say, the reverse proportion, namely, 3 parts of the methyl to 1 part of the ethyl compound, but I do not limit myself to such range of mixtures as modifications thereof can be made to suit the particular requirement of injection molding or other molding operation.

Also, it is possible to polymerize the ethyl methacrylate with methacrylic acid or other active unsaturated acids to increase the softening point of the resulting polymeric material. Similarly, methacrylic acid may be polymerized with methyl methacrylate to yield a material of higher softening point than the polymethyl methacrylate. A derivative of this type with a higher softening point, although it requires higher temperature in an injection molding apparatus, is of advantage in yielding a product less susceptible to cold flow. It may be noted, however, that in copolymerization the ethyl methacrylate appears to be particularly advantageous because of the lessened liability of formation of gas bubbles at the temperatures used in polymerizing when such polymers are being formed.

What I claim is:

1. The process for the preparation of an alkyl ester of methacrylic acid which comprises reacting a silicon halide with substantially stoichiometrical proportions of an alkyl ester of $\alpha$-hydroxy isobutyric acid to form an alkyl oxyisobutyrate silicate and heating said product, whereby decomposition into a hydrated derivative of silicon and the unsaturated ester occurs.

2. The process of making methyl methacrylate which comprises reacting methyl hydroxyisobutyrate with silicon tetrachloride to form a methyl oxyisobutyrate silicate and heating said product, whereby decomposition into a hydrated derivative of silicon and the unsaturated ester occurs.

EDWARD L. KROPA.